United States Patent [19]

Saccoccia

[11] Patent Number: 4,548,387

[45] Date of Patent: Oct. 22, 1985

[54] MOBILE HOIST

[75] Inventor: Pasqualino Saccoccia, Montesilvano Pescara, Italy

[73] Assignee: Euro California, Inc., San Diego, Calif.

[21] Appl. No.: 604,843

[22] Filed: Apr. 27, 1984

[51] Int. Cl.[4] .......... B60P 1/48

[52] U.S. Cl. .......... 254/10 B

[58] Field of Search .......... 254/8 B, 8 C, 8 R, 9 B, 254/9 C, 9 R, 10 B, 10 C, 10 R, 124

[56] References Cited

U.S. PATENT DOCUMENTS 2,906,497 9/1959 Wolf .......... 254/10 B 3,632,085 1/1972 Traywick .......... 259/10 B

FOREIGN PATENT DOCUMENTS 117957 1/1947 Norway .......... 254/8 B 672426 7/1979 U.S.S.R. .......... 254/10 R

OTHER PUBLICATIONS

Edma Brochure, "Panter 70".

*Primary Examiner*—Robert C. Watson

*Attorney, Agent, or Firm*—Baker, Maxham, Callan & Jester

[57] ABSTRACT

A mobile hoist for lifting vehicles and the like includes a base support frame having a vertical tower at one end thereof and an elongated generally Z-shaped boom pivotally supported on and extending outward from the tower includes a support platform on the outer end of the boom with a leveling linkage for maintaining the support platform in a level condition between uppermost position and lowermost positions of the boom with a linear hydraulic lift motor connected between the boom and the support frame for raising and lowering the boom and support platform between a maximum upper position and a lower position. The horizontal support frame includes outwardly or horizontally extending pair of spaced apart legs and ground engaging wheels to enable movement of the lift on a support surface.

8 Claims, 4 Drawing Figures

MOBILE HOIST

BACKGROUND OF THE INVENTION

The present invention relates to lifts and pertains particularly to an improved mobile lift for lifting automobiles and the like.

Access to the underside of automotive vehicles is frequently necessary in order to carry out certain maintenance and repairs. It is desirable in most instances to raise the vehicle to approximately shoulder height of the mechanic to facilitate the repair and maintenance. The typical lift available for raising vehicles to this level is normally available only as a permanent installation in garages and service stations. Such lifts typically comprise a subterranean or below-floor mounted hydraulic or air ram oriented vertically with a generally H-shaped support frame or platform mounted on the upper end of the piston rod of the ram on which the automobile is mounted or supported. Hydraulic or air pressure is introduced into the ram for raising the vehicle to the required position.

Such installations are typically expensive permanent stationary installations. For this reason many service stations and service centers have a single lift available which greatly hampers the number of automobiles that can be serviced in a given period of time.

There have been developed mobile lift units typically available only in Europe for lifting vehicles. The existence of a portable lift would enable the lifting of a vehicle to the desired height and supporting the vehicle at the desired height on stationary jacks while the lift may be removed and moved to other locations for lifting and positioning other vehicles. Such an arrangement would greatly facilitate the rapid and efficient repair and maintenance of automotive vehicles. While lifts of this type are generally available there is considerable room for improvement on such lifts.

It is therefore desirable that an improved mobile lift be available.

SUMMARY AND OBJECTS OF THE INVENTION

It is the primary object of the present invention to provide an improved mobile lift.

In accordance with the primary aspect of the primary invention an improved mobile lift includes an improved linkage with a generally Z-shaped boom and multiple-link leveling linkage for maintaining a support platform on the outer end of the boom in a level condition between maximum upper and lower positions of the support platform.

BRIEF DESCRIPTION OF THE DRAWINGS

The above and other objects and advantages of the invention will become apparent from the following description when read in conjunction with the drawings wherein.

DETAILED DESCRIPTION OF A PREFERRED EMBODIMENT

Figure 1:
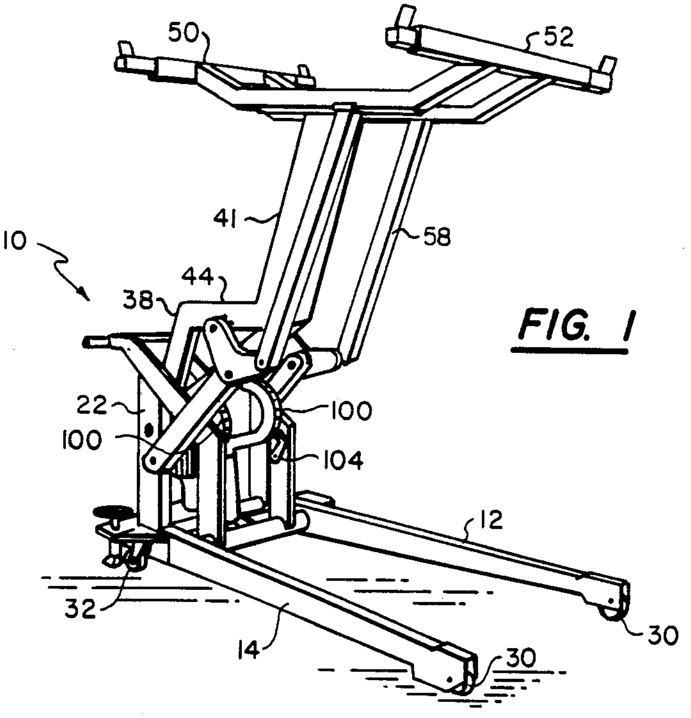
FIG. 1 is a perspective view of a preferred embodiment of the invention.

Referring to the drawings, particularly FIG. 1, a lift in accordance with the invention is designated generally by the numeral 10. The lift in accordance with a preferred embodiment comprises generally a base support frame comprising a pair of generally horizontally extending leg members 12 and 14 connected together at one end by a frame structure including, for example, a pair of horizontally extending tubes 16 and 18. A generally vertically extending framework structure which I term generally "a tower" comprises a pair of spaced apart substantially identical frame members each comprising a front vertical leg 20 and a rear vertical leg 22 with a triangular or V-shaped upper member 24 connected to the two legs and providing an offset positioning of the apex of the upper member 24 where a cross-member 26 connects the framework together. A pair of handles 28 are secured to and extend outward from each side of the framework to enable one to grasp and move the lift about.

A roller or wheel 30 is mounted on the outer end of each of the legs 12 and 14 and a pair of casters 32 are mounted to and beneath a pair of outrigger members 34 extending from opposite sides of the framework. The wheels 30 and casters 32 enable the lift to be rolled and moved around. A pair of hand-operated mechanical jacks 36 are mounted beneath each of the outriggers 34 and are operable to engage a support surface such as the ground or floor of a building or the like for leveling and stabilizing the lift structure and holding it in position to prevent it from rolling about.

The wheel and caster structure enables the lift to be moved about over a suitable flat support surface by hand. The outriggers and jacks enable the lift to be secured in a stationary position and stabilized for the lifting operation.

The lift linkage comprises a boom having an inner end and section 38 pivotally attached or mounted by a pivot pin or structure 40 to the rear uprights 22 of the tower assembly. The boom includes an outer end and section 42 that is offset from and parallel to the inner end section 38 and connected thereto by an offset ssection 44. A brace member 41 connects across between the inner end of the boom and the inner end of the outer section 42 of the boom. This forms a triangular structure at the inner end or half of the boom greatly increases the strength of the boom. The outer end of the boom is pivotally connected by a pivot bracket structure 46 to a support platform which comprises a pair of parallel support rails or members 48 having cross-members 50 and 52 at the ends thereof.

The members 48 of the support platform comprise inner and outer telescoping members which enable an adjustment in the longitudinal length of the frame. The cross-members 50 and 52 are likewise telescoping members which enable the lengthening or adjustment in the length of these members. By such adjustment the support platform can be adjusted to fit substantially any size automobile. Mounted on the opposite ends of each of the cross-members 50 and 52 are pairs of shoes 54 and 56 which are designed to engage the side rails beneath the frame or chassis of an automobile. The shoe members 54 are of a generally L-shape providing a vertical portion for engaging the side of the automobile body for positioning of the shoe member.

Figure 3:
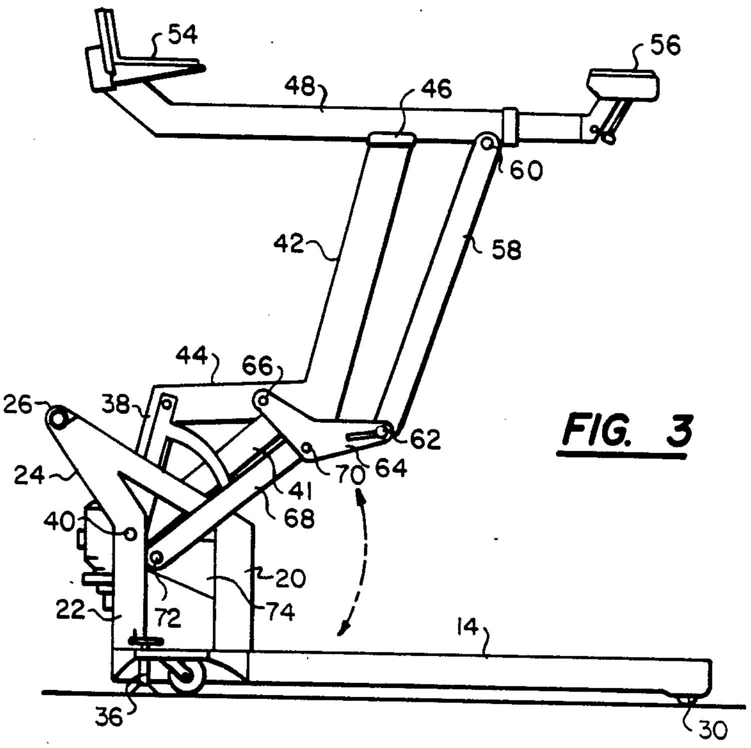
FIG. 3 is a side elevation view of the embodiment of FIG. 1 showing the lift in the uppermost position.
Figure 4:
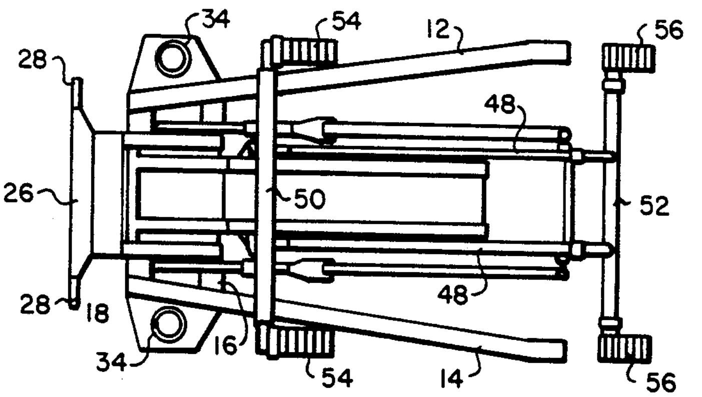
FIG. 4 is a top plan view of the embodiment of FIG. 1.

As seen in FIGS. 1 and 3 the side rails 48 of the support platform curve upward at the ends thereof for the connection of the cross-members 50 and 52 so as to provide clearance underneath the automobile for access to the under carriage and running gear of the automobile. In addition, the shoe members 54 and 56 on both of the cross-members are preferably adjustable vertically to a limited extent, the details of which are not a part of this invention, for the purposes of providing further clearance if desired between the platform frame members 48 and the lower portion of the automobiles body or chassis.

The lift linkage further includes a leveling linkage for maintaining the lift platform in a level condition regardless of the position of the boom between its top and bottom or uppermost and lowermost positions. This leveling linkage comprises an outer link member 58 pivotally connected at the outer end by a pivot pin or the like 60 to the support platform frame 48 and pivotally connected at the inner end by a pivot pin 62 to a generally L-shaped arm 64. The arm 64 is pivotally connected at inner end 66 to the offset connector member 44 of the boom at a position offset from the longitudinal axis of the outer boom section 42. An inner link member 68 is pivotally connected at an outer end 70 to a position approximately the center of link 64 and at an inner end at 72 to the side frames such as to a bracket 74 thereof. This leveling linkage functions substantially like a pair of four-bar linkages or a system of four-bar linkages for maintaining the support platform level during movement of the boom between its uppermost position and its lowermost position.

As can be seen in FIGS. 1 and 3 the boom and leveling linkage assembly when in the uppermost position extend at a slight angle to the vertical with the outer end of the boom and the outer link members 42 and 58 diverging sonewhat at the outer end thereof. The pivoting of the link 64 is offset from the axis of the links or boom section 42 with the arm 64 being longer than the distance between the outer ends of the boom and link 58 yet the link being positioned such that the boom and link diverge at the outer end thereof. The inner end of inner link 68 is pivotally connected to the tower structure at a position slightly below and slightly forward of the pivot point or axis 39 of the boom. With this linkage arrangement and construction the support platform and the boom when in the lowermost position drop below or at least even with the upper surfaces of the legs 12 and 14 to provide minimum height for clearance in passing beneath an automobile. In a typical example the height in the lower position is approximately five and one-half inches such that it will pass beneath the lowest sports cars.

Figure 2:
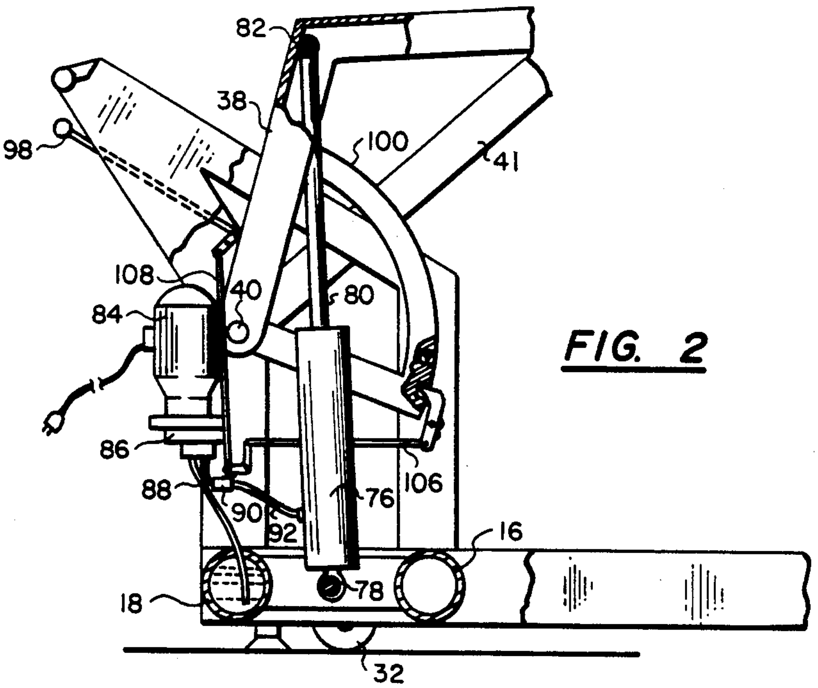
FIG. 2 is a side elevation view enlarged with portions broken away of the embodiment of FIG. 1.

Referring to FIG. 2 a lift motor or power means for raising the boom from its lower position to its upper position includes a linear hydraulic motor in the form of a cylinder 76 pivotally connected at the lower end thereof 78 to the frame structure and including a piston within the cylinder 76 with an elongated rod 80 extending upward and connected at a pivot means 82 at the outer end of the end of the inner section 38 of the boom at the inner surface thereof. This arrangement of the lift motor provides the maximum leverage on the boom for lifting it between its upper and lower limits. The ram or motor 76 is powered by a hydraulic system driven by an electric motor 84 which draws or powers a hydraulic pump 86 drawing fluid from a reservoir formed by tube member 18 through hydraulic lines 88 and feeding the pressurized fluid such as by way of a valve 90 and line 92 to the lower end of the cylinders 76.

The electric motor 84 may be connected to a suitable source of electrical powers such as a typical 110 or 120 volt outlet. A suitable switch, not shown, preferably located in the vicinity of the handles enables operation of the motor for raising the lift to the uppermost position. Lowering of the lift to its lower position is accomplished by operation of a lever 98 which operates through a linkage to release a safety latch and at the same time operate a lowering or relief valve in the lower end of the cylinder 76 for draining the fluid in a controlled manner back to the reservoir.

The safety latch assembly for the present invention includes a pair of arcuate members 100 attached to opposite sides of the boom and having an axis coinciding with the pivot axis 40 of the boom. The arcuate latch members 100 are engaged by pins 102 mounted on arms 104 which are in turn connected by linkage members 106 and 108 to the lever 98. The arms 104 are spring-biased to the notch-engaging position such that the pin 102 is forced into the respective bores and ride out as the boom rises. This action takes place in the fashion of a ratcheting action. The pins 102 engage each successive bore as the boom rises being cammed out by the latch segments 100 but engaging such as to hold the latch segments to prevent the boom from pivoting toward the lowermost position. With this arrangement the boom is automatically mechanically locked in a vertical or lifted position by the latch means 102 until release. Thereby the boom is supported in its position should the hydraulic system fail.

In operation, in order to lift a vehicle, the lift structure is lowered to the lowermost position and the lift manipulated to extend the arms 12 and 14 and the support platform structure along with the boom portion 42 beneath an automobile with the shoes 54 positioned to engage the nearest side frame of the automobile chassis and the shoes 56 positioned and adjusted to engage the farthest side rail or frame rail of the vehicle. Once this adjustment is made and the link of the cross-members 50 and 52 properly adjusted the electrical power is turned on to activate electric motor 84 thereby operating the pump to pressurize the fluid in the cylinder 76 forcing the boom to rise to the desired upper position whereupon the power tube motor 84 is terminated. As the boom rises the latch members 102 automatically engage the notches in the latch segments 100 thereby locking the boom in its uppermost position.

In order to lower the support platform the lever 98 is grasped and pulled downward thereby releasing the latch members 102 from the notches and upon slightly further movement of lever 98 the lowering valve 90 for the hydraulic motor 76 is activated thereby venting the fluid from the lower end of the cylinder 76 thereby permitting the boom to drop to the desired position.

While we have illustrated our invention by means of specific embodiments, it is to be understood that numerous changes and modifications may be made therein without departing from the spirit or scope of the invention as defined in the appended claims.

I claim:

1. A mobile lift for automobile vehicles comprising:

a horizontal base support frame comprising vertical tower means and a pair of spaced apart leg members connected to the base of said tower means and extending outward in a generally common direction, an elongated generally Z-shaped boom having an elongated inner section including an inner end and an elongated outer section including an outer end offset from and parallel to said inner section and an offset member connecting said inner section and said outer section together and pivotally mounted at said inner end to said tower means, a support platform pivotally mounted on the outer end of said boom, leveling linkage means pivotally connected at one end of said tower means and at the other end to said support platform and comprising an arm pivotally connected to said boom intermediate the ends thereof, an outer link connected to said support platform and to said arm, and an inner link connected at one end to said tower and at the other end to said arm for maintaining said support platform in a level condition in all positions of said boom from a lowered position to a maximum lift position, and lift motor means for controllably moving said boom between said lowered position and said maximum lift position.

2. A lift according to claim 1 comprising a brace member secured to and extending between said inner end and said outer section at the juncture of said offset member with said outer section thereby forming a triangle with said inner section and said offset member.

3. A lift according to claim 1 wherein said outer link is connected to the outer end of said arm, and said inner link is connected proximate the middle of said arm.

4. A lift according to claim 3 wherein said boom is pivotally mounted on said tower means at a height substantially equal to the offset of said inner section from said outer section so that said boom rests on and extends substantially parallel to a support surface on which said lift is supported when in said lowered position.

5. A lift according to claim 1 wherein said boom is pivotally mounted on said tower means at a height substantially equal to the offset of said inner section from said outer section so that said boom rests on and extends substantially parallel to a support surface on which said lift is supported when in said lowered position.

6. A lift according to claim 5 comprising a brace member secured to and extending between said inner end and said outer section at the juncture of said offset member with said outer section thereby forming a triangle with said inner section and said offset member.

7. A lift according to claim 6 wherein said outer link is connected to the outer end of said arm, and said inner link is connected proximate the middle of said arm.

8. A mobile lift for automobile vehicles comprising:

a horizontal base support frame comprising vertical tower means and a pair of spaced apart leg members connected to the base of said tower means and extending outward in a generally common direction, an elongated generally Z-shaped boom having an elongated inner section having an inner end and an elongated outer section having an outer end, said sections being connected together by an offset member, and pivotally mounted at said inner end to said tower means, a support platform pivotally mounted on the outer end of said boom, leveling linkage means including an inner link pivotally connected at one end to said tower means and at the other end to an arm pivotally mounted on and intermediate the ends of said boom, and an outer link connected at one end to said arm and said support platform for maintaining said support platform in a level condition in all positions of said boom from a lowered position to a maximum lift position, and hydraulically operated lift motor means for controllably moving said boom between said lowered position and said maximum lift position.

* * * * *